Nov. 22, 1949     C. O. McDONALD     2,488,822
WORK STOP
Filed Jan. 13, 1947
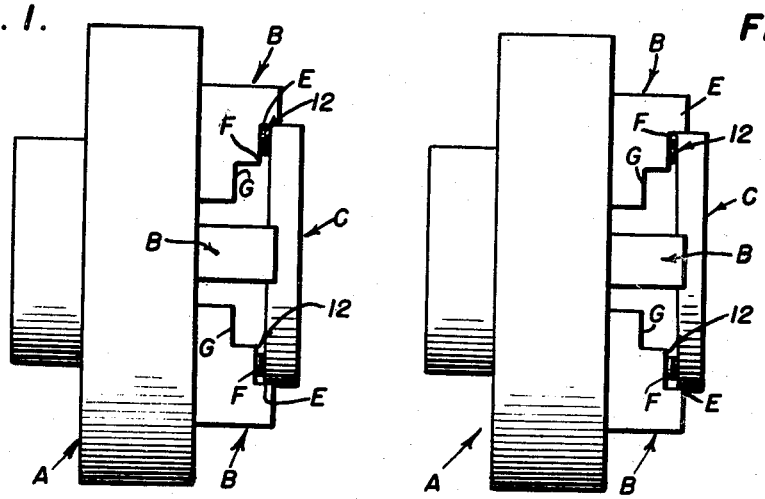
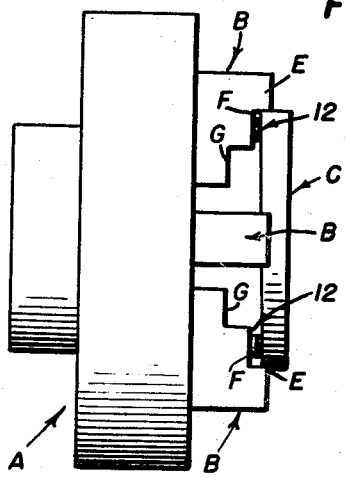
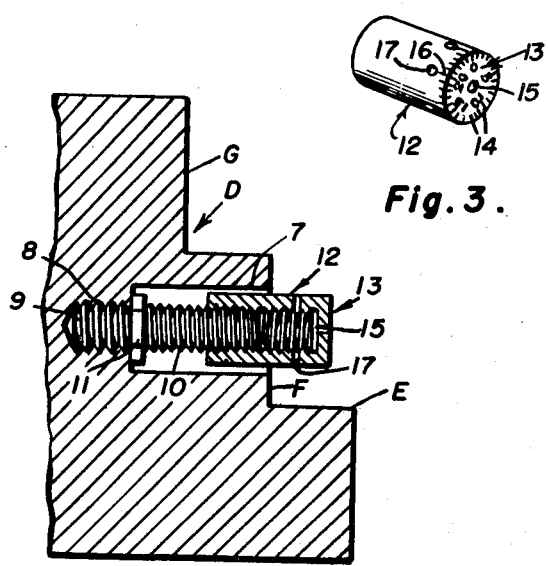
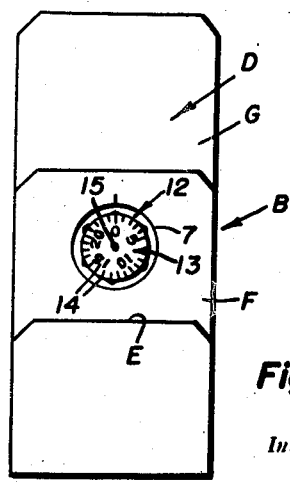
Inventor
Carl O. Mc Donald
By *Clarence A. O'Brien and Harvey B. Jacobson*
Attorneys Patented Nov. 22, 1949

2,488,822

UNITED STATES PATENT OFFICE 2,488,822

WORK STOP

Carl O. McDonald, Osborn View, Ohio

Application January 13, 1947, Serial No. 721,834

3 Claims. (Cl. 279—123)

1

This invention relates to an improved work stop expressly constructed and designed for adaptable use in connection with a lathe chuck and has reference, more particularly, to a stop of micrometer-form which is not only an effective stop or check but is, in addition, a work positioning and position establishing gage.

An object of the invention is to provide a simple and highly practical combination work stop and gage which lends itself aptly and suitably applicable to a regularly constructed lathe chuck jaw and which is precision made and so mounted that it serves to accommodate a relatively thin workpiece for reliable turning, tooling and facing results.

Another object of the invention is to provide a readily attachable jaw-type work stop, the work end of which may be caused to retract and wholly recede into an adapter socket which is provided therefor in the companion and complemental jaw, whereby to permit said end to be projected for use, when wanted, and retracted to an out-of-the-way position when not readied for use.

A further object of the invention has to do with work stops, one for each chuck jaw, this in order that the respective stops may be relatively adjusted with requisite niceties in order to make way for proper handling, and turning a taper on a facing cut.

From a purely structural aspect, the preferred embodiment of the invention takes the form of a double-threaded and shouldered stud, the inner end being threaded for anchorage on the co-acting jaw and the outer end carrying a cylindrical cap or thimble and the latter being provided with oiling, adjusting and calibrated locating facilities.

Other objects, features and advantages will become more readily apparent from the accompanying sheet of drawings.

In the drawings, wherein like numerals are utilized to designate like parts throughout the views:

Figure 1 is an elevational view of a lathe chuck showing the work-piece held in the jaws, and the work stops interposed between the work-piece and jaws.

Figure 2 is likewise an elevational view based on Figure 1 but showing the stops set for turning a taper on a facing cut, this being one of the advantages of the improved stops.

Figure 3 is a detailed perspective view of a cylindrical screw-cap, this being the adjustable part of the improved work stop.

Figure 4 is a fragmentary sectional view of one

2 of the chuck jaws, on an enlarged scale, and showing the work stop partly in elevation and partly in section and projected for use.

Figure 5 is a face or elevational view of Figure 4 observing the same in a direction from right to left.

In Figures 1 and 2 the lathe chuck, which is conventional, is denoted by the reference character A, the same being provided on its working side or face with jaws B, all the same in construction. As shown, particularly in Figures 4 and 5, the side of the jaw which is adapted to receive and clamp the work C in place is of stepped formation as indicated generally at D. The work clamping portion is denoted at E and the complemental steps at F and G.

In carrying out the principles of this invention the step or surface F is formed with a bore 7 having a screw-threaded counter bore 8 at its inner end. The work stop unit comprises a stud having a screw-threaded portion 9 which is screwed into the counter bore 8 and a screw-threaded shank portion 10, together with a stop-shoulder 11. The shoulder 11 is in the form of a hexagonal nut and abuts the inner end of the main bore or socket 7. The shank 10 is of a length less than the depth of the socket 7, and serves to accommodate the cylindrical screw-cap 12. The screw-cap is of a length to permit the same to be screwed into and housed completely within the limits of the socket 7, as is obvious.

The screw-cap has an outer disc like end constructed to provide an indicating dial as at 13 (see Fig. 3), said dial including suitable graduations and numerical indicating indicia 14. The aperture 15 in the center is a conveniently accessible and usable oiling hole. There are additional peripheral graduations at 16 cooperating with the graduations 14 in an obvious easy-to-read manner. The numerals 17 designate additional sockets or holes, these arranged to accommodate an insertable and removable pin or other tool (not shown) such as is employed and handily used to facilitate turning and adjusting the cap.

Referring again to Figures 1 and 2 it is obvious that these views are the same except that Figure 2 serves to illustrate the manner in which co-acting stops may be relatively adjusted with requisite finesse in order to make way for handling and turning a taper on a facing cut. This, as previously mentioned, is one of the outstanding features and advantages of the invention.

It is also to be mentioned that these stop units are bodily attachable and detachable and are precision made to attain the ends desired. Then, too, each stop is such that the work end of the cap may be caused to retract and wholly recede into the adaptor socket 7, this to permit said end to be projected for use as shown in Figure 4, when wanted, or screwed in and retracted to an out-of-the-way position when not in use. In this "out-of-the-way" position the work end of the cap is substantially flush with the surface F.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

What is claimed as new is:

1. In a structure of the class described, in combination, a lathe chuck, a plurality of conventional-type work clamping and retaining jaws mounted for operation on the work face of said chuck, and a work stop separably mounted on and carried entirely by each jaw, said stop being a precision micrometer-type unit and being operable at right angles to the longitudinal axis of said jaw and including a screw-threaded stud with a screw-cap mounted on said stud.

2. In a structure of the class described, in combination, a lathe chuck, a plurality of conventional-type work clamping and retaining jaws, mounted for operation on the work face of said chuck, and a work stop separably mounted on and carried entirely by each jaw, said stop being a precision micrometer-type unit and being operable at right angles to the longitudinal axis of said jaw and including a screw-threaded stud with a screw-cap mounted on said stud, the visible outer end portion of said cap having a scale with graduations providing a dial, and the adjacent rim portion of the cap being provided with additional scale forming graduations.

3. As a new article of manufacture and as a component part of a structural assemblage of the class described, a work stop adapted to be adjustably and detachably mounted on the intermediate portion of a conventional-type work clamping and retaining jaw, said work stop comprising a stud having at its inner end coarse attaching and anchoring threads and fine adjustment threads at its outer end, an internally screw-threaded cap screwed on the threads at the outer end of the stud, the outer end of said cap being provided with scale graduations said stud being provided at the juncture of the coarse and fine threads with a laterally outstanding stop flange, the outer marginal edge portions of said flange being flat-faced to provide convenient tool grip.

CARL O. McDONALD.

REFERENCES CITED

The following references are of record in the file of this patent:

UNITED STATES PATENTS

| Number | Name | Date |
|---|---|---|
| 177,031 | Tierney | May 2, 1876 |
| 199,784 | Brumbaugh | Jan. 29, 1878 |
| 609,019 | Gibbs | Aug. 16, 1898 |
| 1,372,726 | Sloan | Mar. 29, 1921 |